July 12, 1949.　　　W. E. GERBING　　　2,475,955
VARIABLE PITCH PULLEY
Filed Aug. 20, 1947　　　2 Sheets-Sheet 1
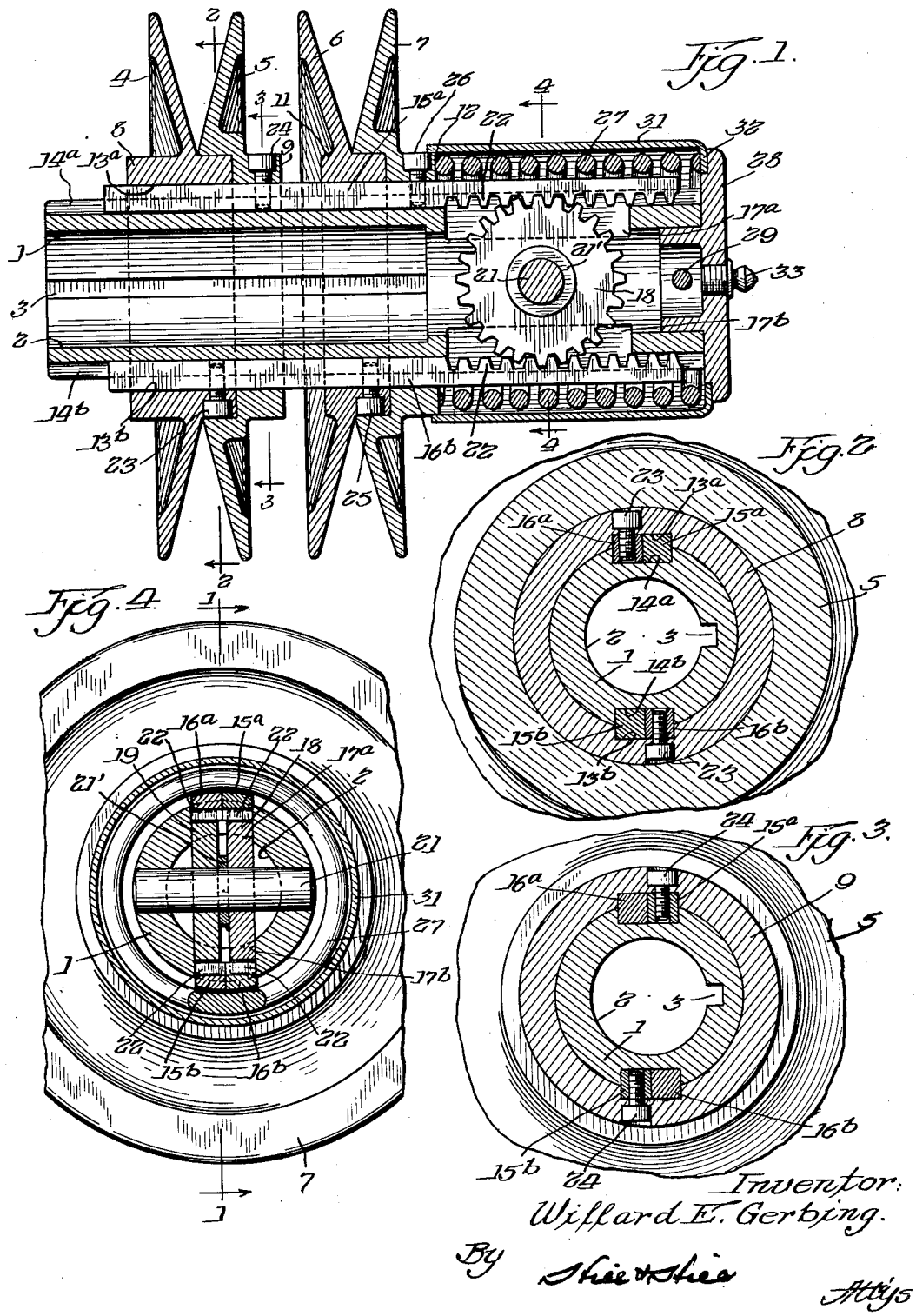
Inventor:
Willard E. Gerbing.
By Thiess & Thiess
Attys

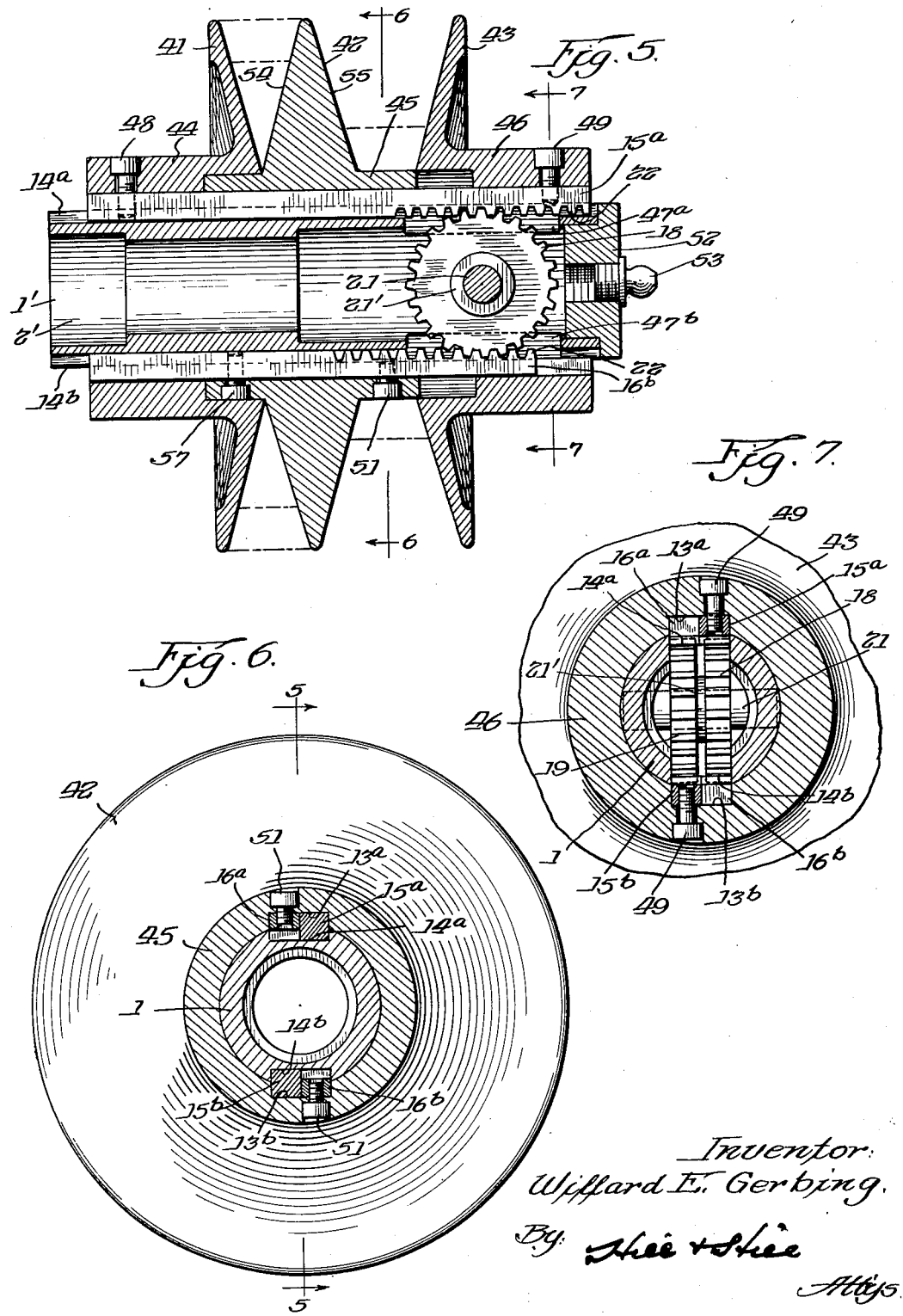

Patented July 12, 1949

2,475,955

UNITED STATES PATENT OFFICE 2,475,955

VARIABLE PITCH PULLEY

Willard E. Gerbing, Chicago, Ill.

Application August 20, 1947, Serial No. 769,577

10 Claims. (Cl. 74—230.17)

The invention relates generally to pulleys and more particularly to a variable pitch type of pulley. The present application is a continuation in part of my pending application, Serial No. 704,585, filed October 21, 1946.

The present invention has among its objects the production of a pulley in which the pitch diameter thereof may be varied without varying the belt center line, embodying the features and advantages of the construction illustrated in the above referred to co-pending application, and which is so constructed that the operating parts thereof will work smoothly and efficiently with no tendency to bind or stick.

Another object of the invention is the production of such a pulley which may contain a plurality of sheave sections for employment in multi-belt operation.

A further object of the present invention is to produce a pulley for multi-belt use which is so constructed that different results may be obtained with very slight modifications in the assembly of the device.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a sectional view of a two sheave pulley construction embodying the present invention taken approximately on the line 1—1 of Fig. 4;

Fig. 2 is a sectional view taken approximately on the line 2—2 of Fig. 1;

Fig. 3 is a sectional view taken approximately on the line 3—3 of Fig. 1;

Fig. 4 is a sectional view taken approximately on the line 4—4 of Fig. 1;

Fig. 5 is a sectional view similar to Fig. 1 of a modified form of the present invention taken approximately on the line 5—5 of Fig. 6;

Fig. 6 is a sectional view taken approximately on the line 6—6 of Fig. 5; and

Fig. 7 is a sectional view taken approximately on the line 7—7 of Fig. 5.

Referring to the drawings, and more particularly to Fig. 1, 1 indicates generally a pulley shaft member having a bore 2 therein of a size to receive a driving shaft, as for example a motor shaft, the bore 2 being provided with a key way 3 for receiving a key carried by the motor shaft, whereby the two shafts may be locked together. Slidably carried on the shaft member 1, in the construction illustrated, are two pair of pulley halves or discs 4, 5, 6 and 7, the halves 4 and 5 comprising one pulley sheave and the halves 6 and 7 the second sheave. The pulley halves 4, 5, 6 and 7 are respectively formed with hub portions 8, 9, 11 and 12, the respective hub portions each having a pair of diametrically opposed key ways 13a and 13b therein, cooperable with similar key ways 14a and 14b in the shaft member 1, for receiving respective pairs of key members, key members 15a and 16a being positioned in the key ways 13a and 14a while a similar pair of key members 15b and 16b are positioned in the cooperable key ways 13b and 14b, thereby rigidly locking the two pair of pulley halves to the shaft member 1, insofar as relative rotation therebetween is concerned.

The shaft member 1 is provided with a pair of oppositely disposed slots 17a and 17b through which extend portions of a pair of pinions 18 and 19 freely rotatable on a pin 21, the axis of which extends perpendicular to the planes of the pinions 18 and 19 and of the key members 15a and 16a. The pin 21 may be held in position by any suitable means as for example a press fit, and the pinions may be spaced by a washer 21'. As illustrated in Figs. 1 and 4, the ends of the key members 15a, 15b and 16a and 16b adjacent the pinions 18 and 19 are provided with gear teeth 22 cooperable with the teeth of the respective pinions, the teeth on the key members 15a and 16b being engageable with the teeth on the pinion 18 and the teeth on the members 16a and 15b being engageable with the teeth on the pinion 19.

As illustrated in Figs. 1, 2 and 3, the hub 8 is secured to key members 16a and 16b by screws 23 while the hub 9 is connected to key members 15a and 15b by screws 24. In like manner, the hub 11 is secured to key members 16a and 16b by screws 25 (only one of which is shown), and in like manner, the hub 12 is secured to key members 15a and 15b by screws 26. Thus, discs 4 and 6 are connected to key members 16a and 16b while the hubs 9 and 12 are connected to key members 15a and 15b, and each pair of corresponding pulley halves are rigidly connected to substantially diametrically opposite key members. As the pinion 18 operatively connects key members 15a and 16b and pinion 19 operatively connects key members 16a and 15b it will be apparent that axial movement of one corresponding pair of pulley halves will be transmitted through the pinions 18 and 19 to the other pair of corresponding pulley halves but in an opposite direction, so that as the halves 4 and 6 move in a direction away from their respective halves 5 and 7, the latter will also move along the shaft member 2 in the opposite direction with the belt center lines for each respective pair of cooperable pulley halves remaining fixed with respect to the shaft member 1.

Encircling the shaft member 1 is a compression spring 27 bearing at one end on the end surface of the hub 12 of the pulley half 7, and at its other end on a cap member 28 secured to the shaft member 1 by any suitable means, as for example, a press fit pin 29 passing through the cap 28 and shaft member 1. The spring 27 is covered by a protective tubular sleeve 31 having an internally extending flange 32 at its outer end positioned between the end of the spring 27 and the cap 28, whereby the spring will maintain the sleeve 31 in position at all times, and as illustrated in Fig. 1, the cap 28 may be provided with a suitable grease fitting 33, whereby lubrication may be forced into the end of the shaft member 1 to provide lubrication for the moving parts. The spring 27 is operative to urge each pair of cooperable pulley halves towards one another into the positions illustrated in Fig. 1 thereby tending to maintain belts running between each pair of cooperable pulley halves at the maximum pitch diameter obtainable from the device. However, by increasing the tension of the respective belts the respective pairs of pulley halves may be separated until the belts are running at a minimum pitch diameter or at any desired pitch diameter therebetween.

It will be apparent that as the pulley halves are each connected to two diametrically opposite key members, stresses resulting from the operation of the device will be balanced on opposite sides of the shaft 1 at all times, insofar as to forces applied through the pinions 18 and 19, thus reducing any tendency of the respective pulley halves to stick as a result of such stresses. It will be noted that in the event of breakage or other failure in the rack and pinion mechanism or of the spring 27, the pulley is not rendered inoperative, the respective pulley halves merely separating to minimum pitch diameters, additional separation being prevented by engagement of the hubs 9 and 11 of the pulley halves 5 and 6 respectively.

While the cooperable pairs of pulley halves in the construction illustrated in Fig. 1 are operative to run at the same simultaneous pitch diameters, the latter being increased or decreased simultaneously and equally, if desired, the respective halves may be so connected to their cooperating key members to provide a reduction in the pitch diameter of one pulley while increasing the pitch diameter of the other. Such a construction is illustrated in Figs. 5, 6 and 7, in which two of the pulley halves are combined into one integral member, for simplicity of construction.

Referring to Fig. 5, slidably carried on the shaft member 1' corresponding to the member 1 in the construction illustrated in Fig. 1, are three discs 41, 42 and 43 having hub portions 44, 45 and 46 respectively. The shaft member 1' is provided with diametrically opposed key ways 14a and 14b in the same manner as the shaft member 1, and the hubs 44, 45 and 46 are each provided with the key ways 13a and 13b. Positioned in the cooperable key ways 13a and 14a are key members 15a and 16a, and in similar manner key members 15b and 16b are positioned in the cooperable key ways 13b and 14b, thereby rigidly locking the shaft member 1' with the discs 41, 42 and 43 insofar as relative rotation thereof is concerned. The shaft member 1' is provided with a pair of slots 47a and 47b corresponding to the slots 17a and 17b, through which extend pinions 18 and 19 in the same manner as illustrated in Figs. 1 and 4, the pinions being rotatably mounted on the pin 21 secured to the shaft member 1' by a press fit or other suitable means and spaced by the washer 21'. Likewise, the key members 15a and b and 16a and b are formed with teeth 22 adjacent the pinions 18 and 19. In this construction the two outer discs 41 and 43 are secured to the key members 15a and 15b by screws 48 and 49 respectively. In similar manner, the disc 42 is secured to the key members 16a and 16b by screws 51. It will be apparent that as the pinion 18 operatively connects key members 15a and 16b which are respectively secured to the pulley discs 41, 43 and the disc 42, that relative movement of the disc 42 will be transmitted to the discs 41 and 43 to move them in the opposite direction, and pinion 19 and key members 16a and 15b will operate in a like manner. Likewise, as key members 15a and 15b are secured to pulley discs 41 and 43 at substantially diametrically opposite sides thereof, and key members 16a and 16b to the disc 42, stresses transmitted to the various pulley discs through the pinions 18 and 19 will be balanced on opposite sides of the axis of the member 1 and the respective discs, eliminating any tendency to cock or bind during operation of the pulley in the same manner as described for the construction illustrated in Fig. 1. The end of the bore 2' adjacent the pinions 18 and 19 is closed by a cap member 52 which may be secured to the member 1' by a press fit or other suitable means, and is provided with a lubrication fitting 53 by means of which the pinions and cooperating parts may be lubricated.

It will be noted in this construction, that the disc 42 forms one-half of each sheave, the side 54 cooperating with the disc 41 to form one sheave and the side 55 cooperating with the disc 43 to form the second sheave. It will be apparent that as the discs 41 and 43 move in one direction, and the disc 42 moves in the opposite direction that the effective pitch diameter of one sheave will increase while the pitch diameter of the other sheave will decrease, this action resulting from the fact that the disc 42 will simultaneously move towards one of the outer discs and away from the other disc. This construction has various applications, as for example, as an idler or counter-shaft pulley the shaft member 1' in such case being freely rotatable on a suitable spindle inserted in the bore 2' and located between a driving shaft and a parallel driven shaft, the driving shaft being connected by a belt with one of the sheaves, and the other sheave to the driven shaft by a second belt, so that by laterally shifting the position of the intermediate or counter-shaft pulley between the two fixed driving and driven shafts the effective pitch diameters of the two sheaves formed by the discs 41, 42 and 43 may be varied to vary the speed of the driven shaft. In such an installation the tension of the two belts balance one another so that a spring, such as the spring 27 illustrated in Figs. 1 and 4, is not required although in certain applications of the pulley it may be desirable to incorporate such a spring in the construction illustrated in Fig. 5.

It will be noted from the above description that

I have provided a variable pitch pulley construction wherein stresses resulting from the operation of the variable pitch mechanism are diametrically applied to the respective halves of each pulley sheave, whereby cocking or binding thereof is eliminated, resulting in very smooth and efficient operation of the device. It will also be noted that all driving torque between the shaft member and the pulley discs or halves is transmitted through key members with none of the driving torque being applied through the equalizing pinions.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a variable pitch pulley, the combination of a shaft member, a pair of opposed pulley halves supported on said shaft and axially slidable relative to the latter and to each other, each of said pulley halves and said shaft having a pair of diametrically positioned keyways in their adjoining surfaces, a pair of key members positioned in each of the respective keyways, the respective pairs of diametrically opposite members being secured to one pulley half and slidable in cooperating keyways in the other half and said shaft, said key members each having a plurality of teeth formed along their opposed surfaces, and a pair of rotatable pinions carried by said shaft member, the teeth of each pinion engaging the teeth of a pair of key members secured to respective pulley halves.

2. In a variable pitch pulley, the combination of a shaft member, a pair of opposed pulley halves supported on said shaft and axially slidable relative to the latter and to each other, each of said pulley halves and said shaft having a pair of diametrically positioned keyways in their adjoining surfaces, a pair of key members positioned in each of the respective keyways, the respective pairs of diametrically opposite members being secured to one pulley half and slidable in cooperating keyways in the other half and said shaft, said key members each having a plurality of teeth formed along their opposed surfaces, a pair of rotatable pinions carried by said shaft member, the teeth of each pinion engaging the teeth of a pair of key members secured to respective pulley halves, and means operatively related to said shaft and one pulley half for maintaining the two halves in engagement with a belt positioned therebetween.

3. In a variable pitch pulley, the combination of a shaft member, a pair of opposed pulley halves supported on said shaft and axially slidable relative to the latter and to each other, said shaft having a pair of keyways therein, each pulley half having a pair of key members rigidly connected thereto, each positioned in one of the keyways in said shaft member, said key members each having a plurality of teeth formed along their opposed surfaces, a pair of rotatable pinions carried by said shaft member, the teeth of each pinion engaging the teeth of a pair of key members secured to respective pulley halves, and means operatively related to said shaft and one pulley half for maintaining the two halves in engagement with a belt positioned therebetween.

4. In a variable pitch pulley, the combination of a shaft member, a pair of opposed pulley halves supported on said shaft and axially slidable relative to the latter and to each other, each of said pulley halves and said shaft having a pair of keyways therein, each pulley half having a pair of key members positioned in respective keyways and rigidly connected to such half, each positioned in one of the keyways in said shaft member and other pulley half, said key members each having a plurality of teeth formed along their opposed surfaces, a pair of rotatable pinions carried by said shaft member, the teeth of each pinion engaging the teeth of a pair of key members secured to respective pulley halves, and means operatively related to said shaft and one pulley half for maintaining the two halves in engagement with a belt positioned therebetween.

5. In a variable pitch pulley, the combination of a shaft member, a pair of opposed pulley halves supported on said shaft and axially slidable relative to the latter and to each other, said shaft having a pair of keyways therein, each pulley half having a pair of key members rigidly connected thereto, each positioned in one of the keyways in said shaft member, said key members each having a plurality of teeth formed along their opposed surfaces, and a pair of rotatable pinions carried by said shaft member, the teeth of each pinion engaging the teeth of a pair of key members secured to respective pulley halves.

6. In a variable pitch pulley, the combination of a shaft member, a plurality of cooperable pulley disks supported on said shaft and axially slidable relative to the latter, said disks operative to form a pair of pulleys, each having a pair of cooperable pulley halves, said shaft having a pair of diametrically positioned keyways therein, a pair of key members positioned in each of the keyways in said shaft member, diametrically opposite key members being rigidly connected to a respective pulley half of each pulley, said key members each having a plurality of teeth formed along their opposed surfaces, and a pair of rotatable pinions carried by said shaft member, the teeth of each pinion engaging the teeth of a pair of key members secured to respective pulley halves of each pulley whereby the halves of each pulley may be moved towards or away from one another while maintaining a fixed distance between belt centers.

7. In a variable pitch pulley, the combination of a shaft member, three cooperable pulley disks supported on said shaft and axially slidable relative to the latter, said disks operative to form a pair of pulleys, each having a pair of cooperable pulley halves, the intermediate disk forming a pulley half of each pulley, said shaft having a pair of diametrically positioned keyways therein, a pair of key members positioned in each of the keyways in said shaft member, one pair of diametrically opposite key members being rigidly connected to the intermediate disk and the other pair of diametrically opposite key members being rigidly connected to the two outer disks, said key members each having a plurality of teeth formed along their diametrically opposed surfaces, and a pair of rotatable pinions carried by said shaft member, the teeth of each pinion engaging the teeth of a pair of key members respectively secured to the intermediate disk and the connected outer disks, whereby the halves of one pulley may be moved towards one another with the halves of the other pulley moved simultaneously away from one another while maintaining a fixed distance between belt centers.

8. In a variable pitch pulley, the combination of a shaft member, two pairs of opposed pulley halves supported on said shaft, the halves of each pulley being axially slidable relative to the shaft and to each other, each of said pulley halves and said shaft having a pair of diametrically positioned keyways in their adjoining surfaces, a pair of key members positioned in each of the respective keyways, respective pairs of diametrically opposite members being secured to a pulley half of each pulley and slidable in cooperating keyways in the shaft and the other half of each pulley, said key members each having a plurality of teeth formed along their opposed surfaces, a pair of rotatable pinions carried by said shaft member, the teeth of each pinion engaging the teeth of a pair of key members secured to respective pulley halves, and means operatively related to said shaft and one pulley half for maintaining the two halves of each pair in engagement with a belt positioned therebetween.

9. In a variable pitch pulley, the combination of a shaft member, a pair of opposed pulley halves supported on said shaft and axially slidable relative to the latter and to each other, said shaft having a pair of longitudinally extending diametric keyways in its peripheral surface, a pair of key members positioned in each of the respective keyways, each respective pair of diametrically opposed members being secured to a respective pulley half and slidable in the keyways in said shaft, said key members each having a plurality of teeth formed along their opposed surfaces, and a pair of rotatable pinions carried by said shaft member, the teeth of each pinion engaging the teeth of a pair of key members secured to respective pulley halves.

10. In a variable pitch pulley, the combination of a shaft member, a pair of opposed pulley halves supported on and rotatable with said shaft and axially slidable relative to the latter and to each other, each of said pulley halves having a pair of longitudinally extending diametrically positioned grooves therein adjacent said shaft, a pair of members positioned in each of the respective grooves, the respective pairs of diametrically opposed members being secured to one pulley half and slidable in the grooves in the other half, said members each having a plurality of teeth formed along their opposed surfaces, and a pair of rotatable pinions carried by said shaft, the teeth of each pinion engaging the teeth of a pair of members secured to respective pulley halves.

WILLARD E. GERBING.

REFERENCES CITED

The following references are of record in the file of this patent:

UNITED STATES PATENTS

| Number | Name | Date |
|---|---|---|
| 2,117,485 | Lewellen | May 17, 1938 |
| 2,203,149 | Hoover | June 4, 1940 |
| 2,253,921 | Van Sant | Aug. 26, 1941 |
| 2,382,935 | Watson | Aug. 14, 1945 |